(12) United States Patent
Moon et al.

(10) Patent No.: US 12,444,186 B2
(45) Date of Patent: Oct. 14, 2025

(54) IMAGE PROCESSING APPARATUS AND METHOD FOR PROCESSING IMAGE TO BE PROVIDED TO NEAR-EYE DISPLAY APPARATUS

(71) Applicant: SAMSUNG ELECTRONICS CO., LTD., Suwon-si (KR)

(72) Inventors: Seokil Moon, Suwon-si (KR); Changkun Lee, Seoul (KR); Geeyoung Sung, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 616 days.

(21) Appl. No.: 17/891,795

(22) Filed: Aug. 19, 2022

(65) Prior Publication Data

US 2023/0252780 A1 Aug. 10, 2023

(30) Foreign Application Priority Data

Feb. 4, 2022 (KR) .................. 10-2022-0015077

(51) Int. Cl.
| | |
|---|---|
| *G06V 10/98* | (2022.01) |
| *G02B 27/01* | (2006.01) |
| *G02B 30/33* | (2020.01) |
| *G02F 1/13357* | (2006.01) |
| *G06N 3/04* | (2023.01) |

(Continued)

(52) U.S. Cl.
CPC ......... *G06V 10/98* (2022.01); *G02B 27/0172* (2013.01); *G02B 30/33* (2020.01); *G02F 1/133611* (2013.01); *G06N 3/04* (2013.01); *G06N 3/08* (2013.01); *G06T 5/50* (2013.01); *G06T 5/60* (2024.01); *G06T 5/92* (2024.01); *G06V 10/143* (2022.01); *G02B 27/017* (2013.01); *G02B 2027/0178* (2013.01); *G06T 5/00* (2013.01); *G06T 2207/10024* (2013.01);
(Continued)

(58) Field of Classification Search
CPC .. G06V 10/98; G06V 10/143; G02B 27/0172; G02B 2027/0178; G02B 27/017; G02B 30/33; G02F 1/133611; G06T 5/50; G06T 2207/10024; G06T 2207/20081; G06T 2207/20084; G06T 2207/20221; G06T 5/60; G06T 5/92; G06T 5/00; G06N 3/04; G06N 3/08
See application file for complete search history.

(56) References Cited

U.S. PATENT DOCUMENTS

| | | | |
|---|---|---|---|
| 2016/0133055 A1 | 5/2016 | Fateh | |
| 2018/0052277 A1* | 2/2018 | Schowengerdt | ..... H04N 9/3102 |

(Continued)

FOREIGN PATENT DOCUMENTS

KR 10-2021-0008889 A 1/2021

*Primary Examiner* — Amandeep Saini
*Assistant Examiner* — Daniella M. DiGuglielmo
(74) *Attorney, Agent, or Firm* — Sughrue Mion, PLLC

(57) ABSTRACT

An image processing method and apparatus include: obtaining a plurality of input optical images and a plurality of output optical images for a near-eye display apparatus; training a neural network for modeling the waveguide optical system by using a training set including the obtained input and output optical images; and obtaining a uniformity correction image to be input to the trained neural network such that the trained neural network then outputs a target uniformity image having certain brightness uniformity.

21 Claims, 16 Drawing Sheets

(51) Int. Cl.
*G06N 3/08* (2023.01)
*G06T 5/00* (2024.01)
*G06T 5/50* (2006.01)
*G06T 5/60* (2024.01)
*G06T 5/92* (2024.01)
*G06V 10/143* (2022.01)

(52) U.S. Cl.
CPC .............. *G06T 2207/20081* (2013.01); *G06T 2207/20084* (2013.01); *G06T 2207/20221* (2013.01)

(56) References Cited

U.S. PATENT DOCUMENTS

| | | | |
|---|---|---|---|
| 2018/0231784 A1* | 8/2018 | Koudsi | G02B 27/0172 |
| 2021/0018751 A1* | 1/2021 | Shmunk | G02B 27/0179 |
| 2021/0073959 A1* | 3/2021 | Elmalem | G06N 3/084 |

\* cited by examiner

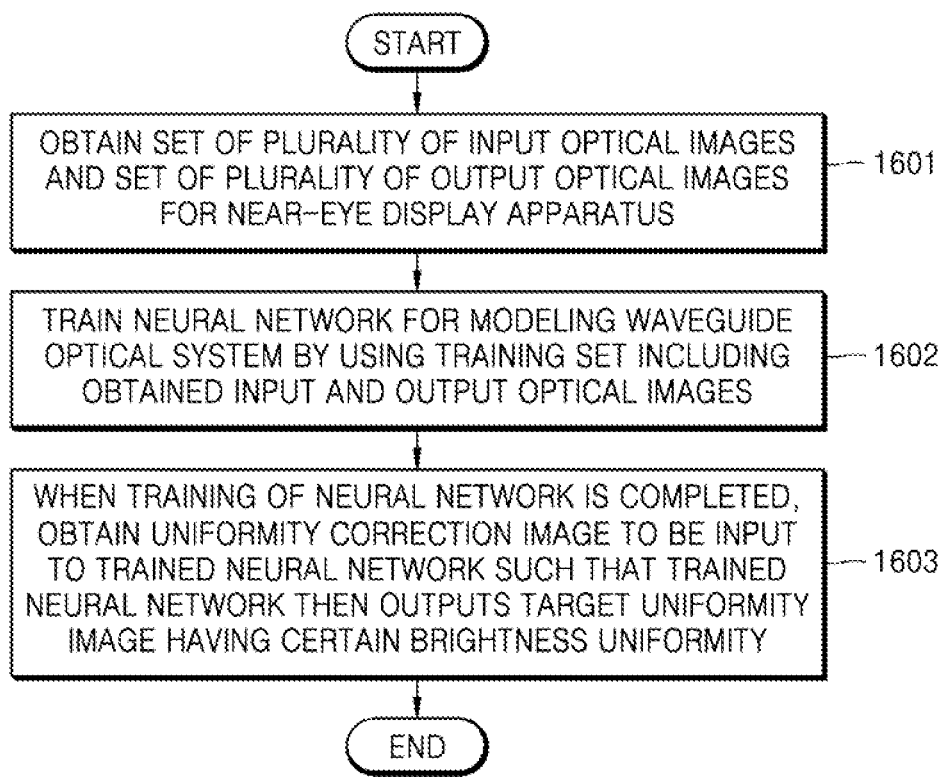

IMAGE PROCESSING APPARATUS AND METHOD FOR PROCESSING IMAGE TO BE PROVIDED TO NEAR-EYE DISPLAY APPARATUS

CROSS-REFERENCE TO RELATED APPLICATION

This application is based on and claims priority under 35 U.S.C. § 119 to Korean Patent Application No. 10-2022-0015077, filed on Feb. 4, 2022, in the Korean Intellectual Property Office, the disclosure of which is incorporated by reference herein in its entirety.

BACKGROUND

1. Field

The disclosure relates to an image processing apparatus and method, and more particularly, to an image processing apparatus and method for processing an image to be provided to a near-eye display apparatus.

2. Description of the Related Art

Virtual reality is a technology that enables a person to experience life in a computer-generated virtual world. Augmented reality is a technology that allows virtual images to be mixed with physical environments or spaces in the real world. Near-eye displays in which virtual reality displays or augmented reality displays are implemented focus a virtual image on a space by using a combination of optical and stereoscopic images. In such near-eye displays, display resolution and processing are important.

An augmented reality apparatus, which is an example of a near-eye display apparatus, enables a user to view augmented reality, and examples thereof include augmented reality glasses. An image optical system of an augmented reality apparatus includes an image generation device for generating an image and a waveguide for guiding the generated image to an eye. Such an augmented reality apparatus has a wide viewing angle and high image quality, and it is necessary to reduce the weight and size of the apparatus itself.

Recently, waveguide-based optical systems have been studied and developed for augmented reality apparatuses such as augmented reality glasses. In the related art, light is input into a waveguide by using free-curved surface reflection or multi-mirror reflection, or by using an input-coupling diffractive element such as a diffractive optical element or a holographic optical element. When free-curved surface reflection or multi-mirror reflection is used, the structure may be simple and the optical transmission efficiency may be high, but there is a limitation in the viewing angle and difficulty in reducing the size of the waveguide. In addition, the uniformity of light propagating through the waveguide is low, and accordingly, the image quality may be deteriorated.

SUMMARY

Various embodiments provide an image processing apparatus and method. Technical objects of the disclosure are not limited to those described above, and other technical objects may be inferred from the following embodiments.

Additional aspects will be set forth in part in the description which follows and, in part, will be apparent from the description, or may be learned by practice of embodiments of the disclosure.

In accordance with an aspect of the disclosure, an image processing method includes obtaining a plurality of input optical images and a plurality of output optical images for a near-eye display apparatus, the plurality of output optical images being output by a waveguide optical system provided in the near-eye display apparatus when the plurality of input optical images is input to the waveguide optical system; training a neural network for modeling the waveguide optical system by using a training set comprising the obtained plurality of input optical images and the obtained plurality of output optical images; and obtaining, when the training of the neural network is completed, a uniformity correction image to be input to the trained neural network such that the trained neural network then outputs a target uniformity image having a certain brightness uniformity.

The trained neural network may be configured to obtain, upon a first input optical image being input thereto, a first output optical image, which is identical to an image output by the waveguide optical system upon the first input optical image being input thereto, and thus corresponds to a brightness uniformity performance of the waveguide optical system.

The obtaining of the uniformity correction image may include obtaining, by a processor, the uniformity correction image by learning images to be input to the trained neural network in a state in which the target uniformity image is fixed as a target image of the trained neural network.

The trained neural network may be obtained by modeling, into an image processing model, optical propagation in the waveguide optical system of the near-eye display apparatus for reproducing the plurality of input optical images as the plurality of output optical images.

The target uniformity image may include a white color image.

The waveguide optical system may include an input coupler that inputs light into a waveguide, and an output coupler including a plurality of grating regions for outputting the light propagating in the waveguide to an outside.

Diffraction efficiencies of the plurality of grating regions may be adjusted to be different from each other for optimization of a brightness uniformity of each output optical image of the plurality of output optical images.

The diffraction efficiency of each of the plurality of grating regions may be determined based on a diffraction efficiency calculated when light perpendicular to a center field of the input coupler is incident on the input coupler, and based on a diffraction efficiency calculated when light is obliquely incident on the input coupler.

The image processing method may further include providing the obtained uniformity correction image to the near-eye display apparatus, wherein the near-eye display apparatus outputs, via the waveguide optical system, an image obtained by combining an input optical image with the obtained uniformity correction image.

A non-transitory computer-readable recording medium may have recorded thereon a program for executing a method according to an above-noted aspect of the disclosure on a computer.

In accordance with an aspect of the disclosure, an image processing apparatus includes a memory; and at least one processor configured to execute a program to process an image to be provided to a near-eye display apparatus, wherein the at least one processor is further configured to obtain a plurality of input optical images and a plurality of output optical images for the near-eye display apparatus; train a neural network for modeling a waveguide optical system of the near-eye display apparatus by using a training set including the obtained plurality of input optical images and the plurality of output optical images; and obtaining, when the training of the neural network is completed, a uniformity correction image to be input to the trained neural network such that the trained neural network then outputs a target uniformity image having a certain brightness uniformity, wherein the plurality of output optical images are output by the waveguide optical system when the plurality of input optical images are input to the waveguide optical system.

The trained neural network may be configured to obtain, upon a first input optical image being input thereto, a first output optical image, which is identical to an image output by the waveguide optical system upon the first input optical image being input thereto, and thus corresponds to a brightness uniformity performance of the waveguide optical system.

The at least one processor may be further configured to obtain the uniformity correction image by learning images to be input to the trained neural network in a state in which the target uniformity image is fixed as a target image of the trained neural network.

The neural network may be obtained by modeling, into an image processing model, optical propagation in the waveguide optical system of the near-eye display apparatus for reproducing the plurality of input optical images as the plurality of output optical images.

The target uniformity image may include a white color image.

The waveguide optical system may include an input coupler that inputs light into a waveguide, and an output coupler including a plurality of grating regions for outputting the light propagating in the waveguide to an outside.

Diffraction efficiencies of the plurality of grating regions may be adjusted to be different from each other for optimization of a brightness uniformity of each output optical image of the plurality of output optical images.

The diffraction efficiency of each of the plurality of grating regions may be determined based on a diffraction efficiency calculated when light perpendicular to a center field of the input coupler is incident on the input coupler, and based on a diffraction efficiency calculated when light is obliquely incident on the input coupler.

The image processing may be configured to provide the obtained uniformity correction image to the near-eye display apparatus, and the near-eye display apparatus may output, via the waveguide optical system, an image obtained by combining an input optical image with the obtained uniformity correction image.

A near-eye display apparatus may include an image processor configured to perform image processing to generate an image by combining an input optical image with the uniformity correction image obtained from the image processing apparatus of an above-noted aspect of the disclosure; and the waveguide optical system configured to output an output optical image based on image light corresponding to the generated image.

In accordance with an aspect of the disclosure, a near-eye display apparatus includes a memory storing a previously generated uniformity correction image for correcting a brightness uniformity of an input optical image to be displayed through the near-eye display apparatus; an image processor configured to generate an output optical image in which the brightness uniformity of the input optical image is corrected by performing an image processing operation of combining the input optical image with the uniformity correction image; and a waveguide optical system configured to output the output optical image based on image light corresponding to the output optical image, wherein the uniformity correction image corresponds to an image configured to cause a neural network for modeling the waveguide optical system on which optimization of grating efficiency of grating regions is performed, to output a target image having a certain brightness uniformity.

The image processing operation may include a convolution operation between the input optical image and the uniformity correction image.

The uniformity correction image may be obtained by learning images to be input to the neural network in a state in which the target image is fixed as an output image of the neural network.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 16 is a diagram for describing an image processing method according to an example embodiment.

DETAILED DESCRIPTION

Figure 1:
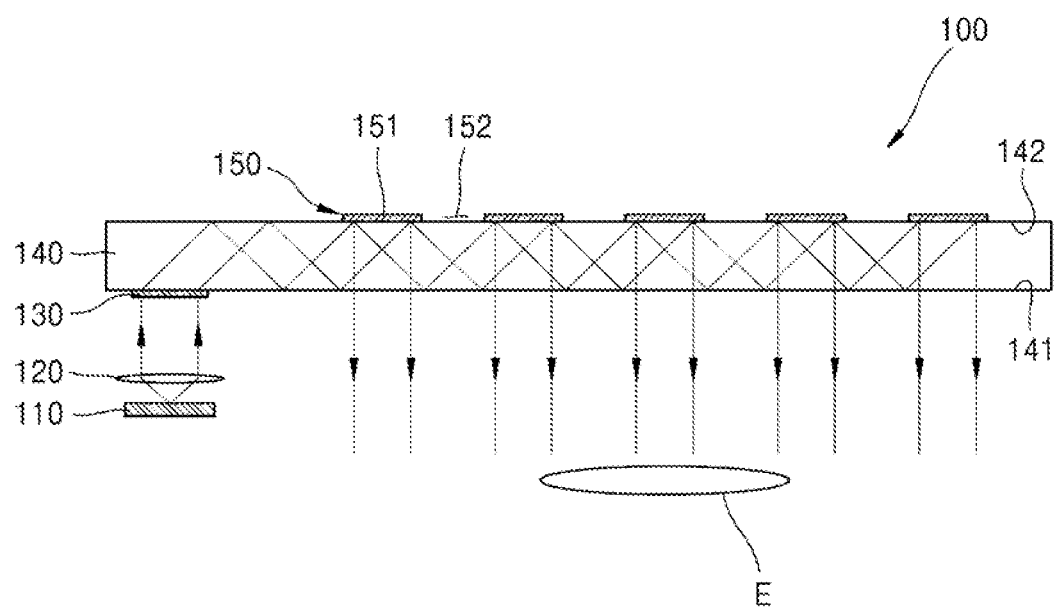
FIG. 1 is a diagram illustrating a near-eye display apparatus according to an example embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Although the terms used in the disclosure are selected from among common terms that are currently widely used in consideration of their function in the disclosure, the terms may be different according to an intention of one of ordinary skill in the art, a precedent, or the advent of new technology. Also, in particular cases, the terms are discretionally selected by the applicant of the disclosure, in which case, the meaning of those terms will be described in detail in the corresponding part of the detailed description. Therefore, the terms used in the disclosure are not merely designations of the terms, but the terms are defined based on the meaning of the terms and content throughout the disclosure.

In the description of embodiments, it will be understood that when an element is referred to as being "connected to" another element, it may be "directly connected to" the other element or be "electrically connected to" the other element through an intervening element. The singular expression also includes the plural meaning as long as it is not inconsistent with the context. In addition, when an element is referred to as "including" a component, the element may additionally include other components rather than excluding other components as long as there is no particular opposing recitation.

The terms such as "include" or "comprise" used herein should not be construed as necessarily including all various elements or operations described herein and should be understood that some of the elements or operations may be omitted or additional elements or operations may be further provided.

In addition, although the terms such as "first" or "second" may be used herein to describe various elements, these elements should not be limited by these terms. These terms are only used to distinguish one element from another element.

It should be understood that the scope of embodiments is not limited by the description of certain embodiments below and matters that can be easily derived by those of ordinary skill in the art fall within the scope of embodiments. Hereinafter, example embodiments will be described in detail with reference to the accompanying drawings.

Figure 2:
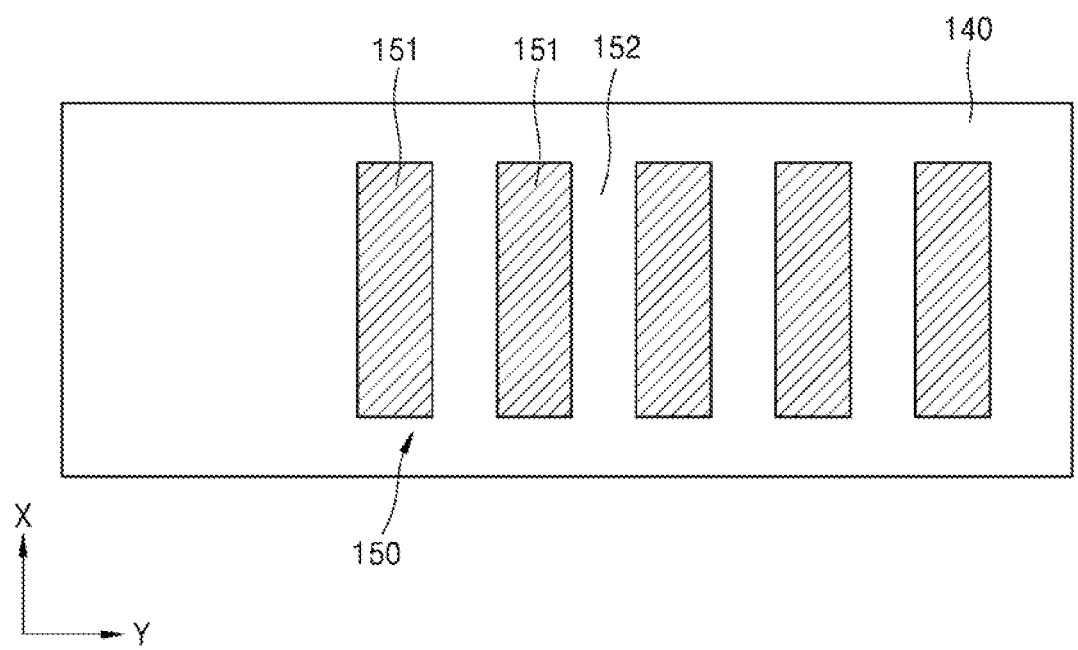
FIG. 2 is a diagram illustrating a waveguide optical system of a near-eye display apparatus according to an example embodiment.

FIG. 1 is a diagram illustrating a near-eye display apparatus 100 according to an example embodiment, and FIG. 2 is a diagram illustrating a waveguide optical system of the near-eye display apparatus 100.

The near-eye display apparatus 100 includes a display element 110 that emits light for forming an image, a waveguide 140 that guides the light from the display element 110, an input coupler 130 that inputs the light into the waveguide 140, and an output coupler 150 that outputs the light propagating in the waveguide 140 to the outside.

The display element 110 may include a liquid-crystal display (LCD), a liquid crystal on silicon (LCoS) display, an organic light-emitting diode (OLED) display, a light-emitting diode (LED) display, a projector, and the like. The display element 110 may process an image signal to generate a two-dimensional image or a three-dimensional image. The display element 110 may include a computer-generated holography (CGH) unit to generate a holographic image.

An image output from the display element 110 may be incident on the waveguide 140 and then delivered to an eye E of a user through the waveguide 140. In the disclosure, the term 'image' includes a concept of image light for displaying a corresponding image.

The waveguide 140 may include a first surface 141 on which light is incident, and a second surface 142 opposite to the first surface 141. The input coupler 130 may be provided on at least one of the first surface 141 and the second surface 142. FIG. 1 illustrates an example in which the input coupler 130 is provided on the first surface 141. A lens 120 may be further provided between the display element 110 and the input coupler 130. The lens 120 may collimate image light emitted from the display element 110 to be incident on the input coupler 130.

Referring to FIG. 2, the output coupler 150 may include a plurality of grating regions 151. The plurality of grating regions 151 may be spaced apart from each other, and non-grating regions 152 may be provided between the grating regions 151. When the grating regions 151 of the output coupler 130 are discontinuously arranged, brightness uniformity of light propagating through the waveguide 140 may be improved. When the waveguide 140 is applied to a glasses-type near-eye display apparatus, the waveguide 140 may be formed to be significantly thin in a lens portion of the glasses, and accordingly, the wearing convenience of a user may increase.

Meanwhile, the intervals between adjacent grating regions 151 may be equal to each other. However, the disclosure is not limited thereto, and the intervals between the grating regions 151 may gradually decrease in any one direction. That is, the intervals between the grating regions 151 may gradually decrease in a direction of propagation of light (e.g., the Y direction). For example, the intervals between the grating regions 151 may be about 1 mm to about 5 mm. Alternatively, the intervals between the grating regions 151 may be about 2 mm to about 4 mm.

Light propagating through the waveguide 140 is diffracted several times, i.e., when it reaches the grating regions 151 before being emitted from the waveguide 140, and the diffraction efficiencies of the grating regions 151 may be adjusted according to the position of the waveguide 140 in order to adjust the uniformity of light being emitted from the waveguide 140. In an example embodiment, the uniformity of light observed in a particular eye box region may be increased by alternately arranging the grating regions 151 and the non-grating regions 152.

An image may be provided to the user by using diffraction of light in the grating regions 151 and total reflection of light in the waveguide 140. The collimated light may be diffracted by the input coupler 130 at an angle greater than a critical angle, and then propagate through the waveguide 140. Light may be expanded in the first direction (e.g., the X direction as shown in FIG. 2) by the input coupler 130, and may be expanded in a second direction (e.g., the Y direction as shown in FIG. 2) by the output coupler 150.

Figure 3:
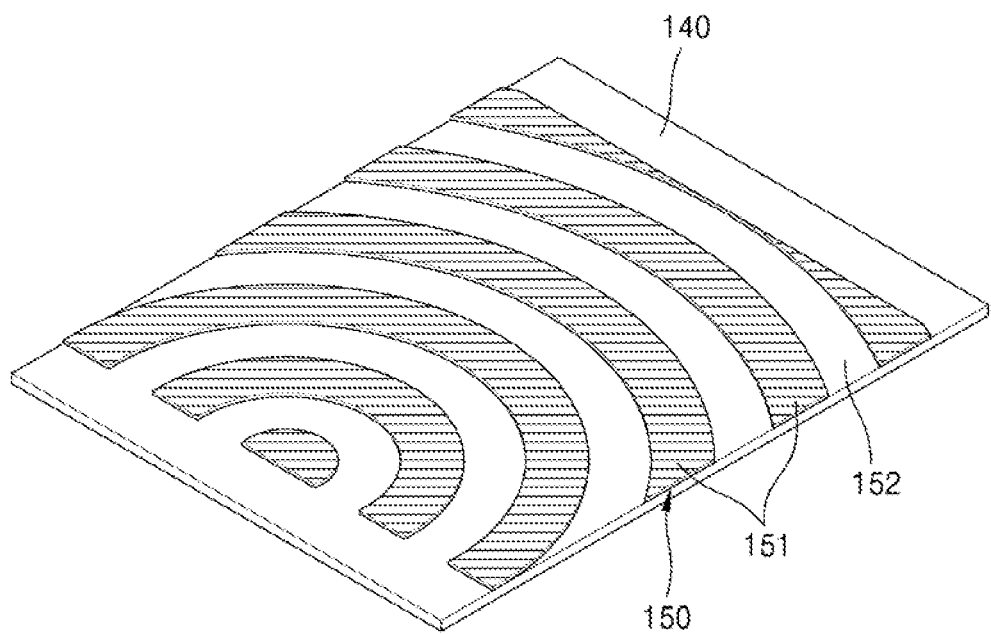
FIG. 3 is a diagram illustrating a waveguide optical device according to an example embodiment.

FIG. 3 is a diagram illustrating an example of an arrangement structure of the grating regions 151 of the output coupler 150. The grating region 151 may be arranged in, for example, a structure of partially cut rings. In addition, the grating regions 151 may be arranged to be spaced apart from each other in a concentric semicircular arrangement structure. Also, the grating regions 151 may be configured to have different diffraction efficiencies. For example, the grating regions 151 may be configured such that the diffraction efficiencies of the grating regions 151 gradually increase in a direction in which light is guided by the waveguide 140 (e.g., a direction away from the input coupler 130).

In general, in a waveguide having gratings continuously provided in the entire region thereof, when light is totally reflected in the waveguide and then is diffracted in an output coupler, a region of the gratings in the output coupler that the light does not reach may exist according to an incident angle component of the light. Also, part of expanded light may propagate in another direction without reaching the eye box. For this reason, when gratings of an output coupler are continuously provided in a waveguide, the uniformity of light may decrease.

In the near-eye display apparatus 100 according to an example embodiment, the grating regions 151 of the output coupler 150 may be sparsely arranged to increase the uniformity of light, and accordingly, the number of times of reflection may be reduced to increase light efficiency.

Figure 4:
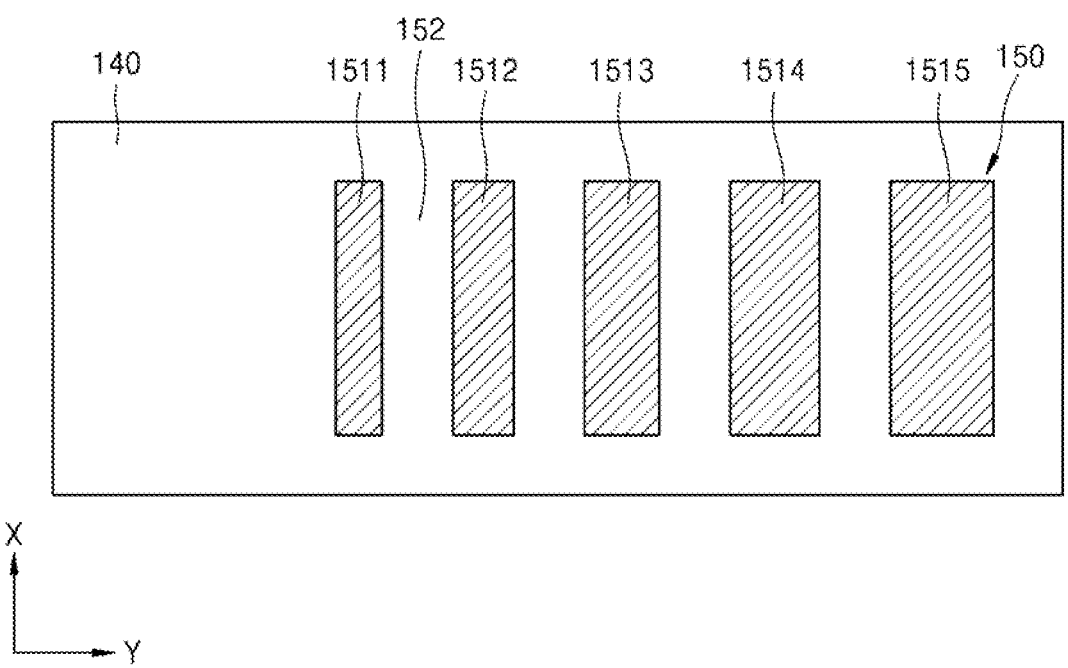
FIG. 4 is a diagram illustrating a waveguide optical device according to an example embodiment.

Referring to FIG. 4, the output coupler 150 may include a first grating region 1511, a second grating region 1512, a third grating region 1513, a fourth grating region 1514, and a fifth grating region 1515. The non-grating regions 152 may be provided between the grating regions 1511 to 1515. The surface areas of the grating regions 1511 to 1515 may gradually increase in a direction of propagation of light (e.g., the Y direction). For example, the output coupler 150 may be configured to have a relationship of (the surface area of the first grating region 1511)<(the surface area of the second grating region 1512)< (the surface area of the third grating region 1513)<(the surface area of the fourth grating region 1514)< (the surface area of the fifth grating region 1515).

Alternatively, when the diffraction efficiency of positive first-order diffracted light (or negative first-order diffracted light) of the first grating region 1511 is E1, the diffraction efficiency of the second grating region 1512 is E2, the diffraction efficiency of the third grating region 1513 is E3, the diffraction efficiency of the fourth grating region 1514 is E4, and the diffraction efficiency of the fifth grating region 1515 is E5, a relationship of E1<E2<E3<E4<E5 may be satisfied.

When the output coupler 150 includes six grating regions, the diffraction efficiencies (i.e., E1, E2, E3, E4, E5, and E6) of the six grating regions may be configured as Table 1 below. This is only an example, and the diffraction efficiency of a grating region may be variously configured according to the shape and size of the grating region.

TABLE 1

| | Positive first-order diffraction efficiency (%) | Negative first-order diffraction efficiency (%) | Zero-order diffraction efficiency (%) |
| --- | --- | --- | --- |
| E1 | 14 | 14 | 72 |
| E2 | 15 | 15 | 70 |
| E3 | 25 | 25 | 50 |

TABLE 1-continued

| | Positive first-order diffraction efficiency (%) | Negative first-order diffraction efficiency (%) | Zero-order diffraction efficiency (%) |
| --- | --- | --- | --- |
| E4 | 35 | 35 | 30 |
| E5 | 45 | 45 | 10 |
| E6 | 50 | 50 | 0 |

The direction and period of a grating may be designed to expand incident light in the appropriate direction and angle. The diffraction efficiency of each grating region may be determined by performing an optimization calculation for adjusting brightness uniformity. Referring to Table 1, when the grating regions having the structure illustrated in FIG. 3 are provided, positive first-order diffracted light and negative first-order diffracted light of the grating may be used. As a result of calculating the diffraction efficiency of each grating region, the diffraction efficiency of the first grating region for the positive first-order diffracted light and the negative first-order diffracted light is 14%, and the remaining 72% of the light is totally reflected and is then transferred to the second grating region. The diffraction efficiencies of the second grating region, the third grating region, the fourth grating region, the fifth grating region, and the sixth grating region for the positive first-order diffracted light and the negative first-order diffracted light may be of 15%, 25%, 35%, 45%, and 50%, respectively. In the sixth grating region, the sum of diffraction efficiencies for the positive first-order diffracted light and the negative first-order diffracted light may be 100% in order to diffract all remaining light not diffracted by the other previous grating regions.

The area of each grating region may be adjusted by adjusting at least one of the X-direction length and the Y-direction length of the grating region. Here, for example, the X-direction lengths of the grating regions are equal to each other, and the areas of the grating regions may be differently adjusted by respectively adjusting their Y-direction lengths.

Figure 5:
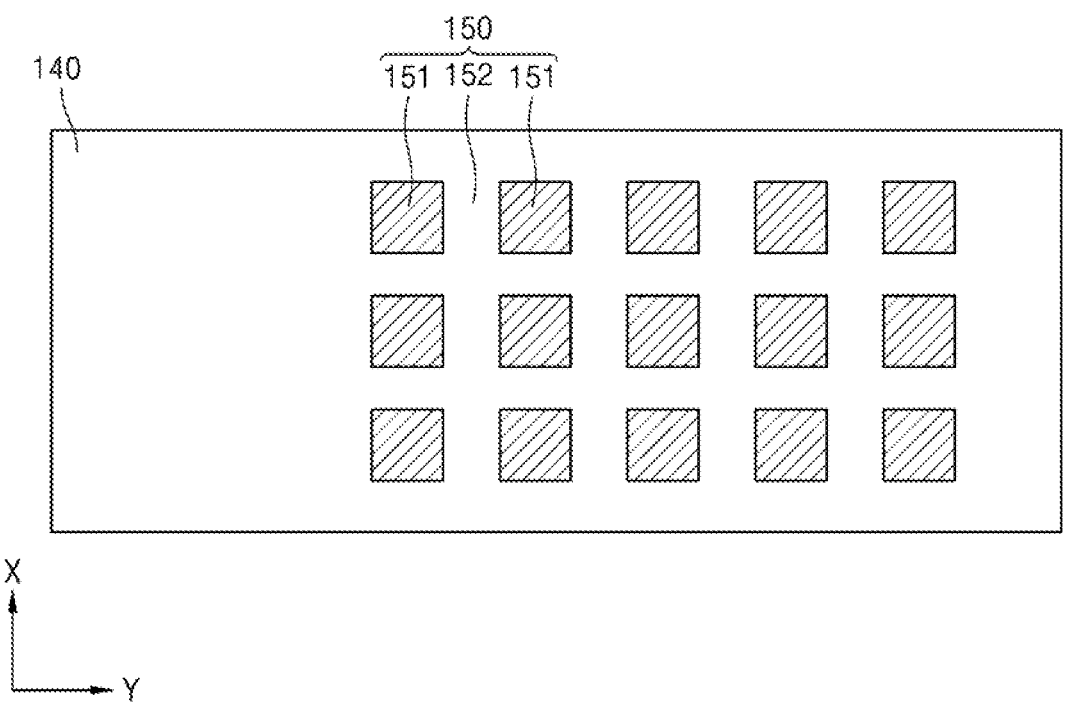
FIG. 5 is a diagram illustrating a waveguide optical device according to an example embodiment.

Referring to FIG. 5, the grating regions 151 of the output coupler 150 may be arranged to have a two-dimensional array structure. As described above, the uniformity of light in the X-direction and the Y-direction may be increased by arranging the grating regions 151 to be spaced apart from each other in a matrix structure.

Figure 6:
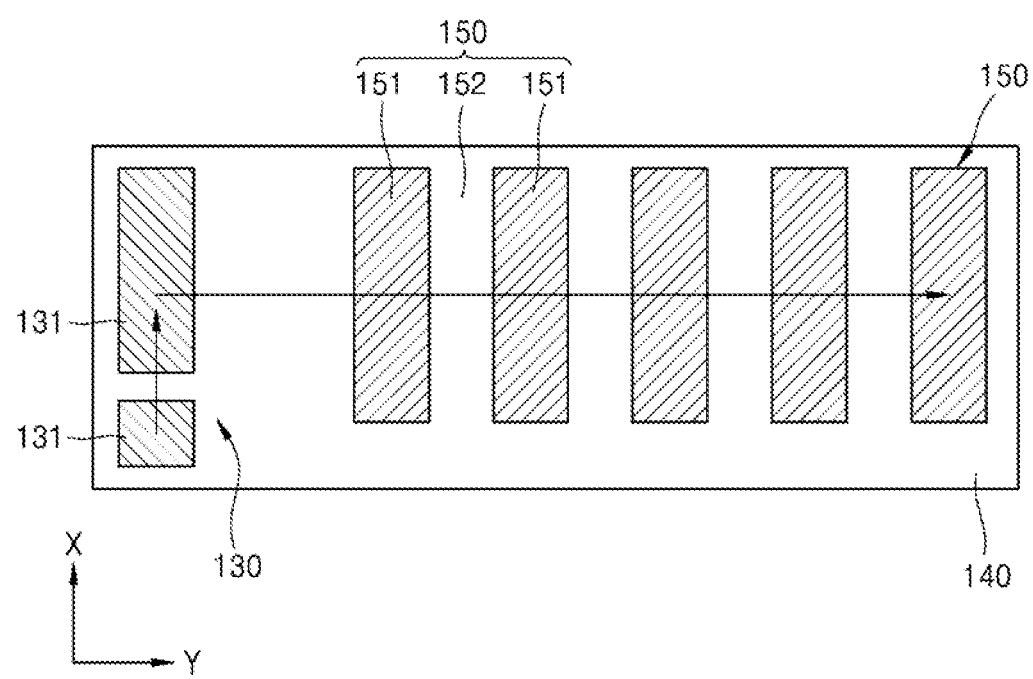
FIG. 6 is a diagram illustrating a waveguide optical device in which grating regions of an input coupler are arranged to be spaced apart from each other, according to an example embodiment.

Referring to FIG. 6, the input coupler 130 may include a plurality of grating regions 131. The grating regions 131 of the input coupler 130 may be spaced apart from each other in the X direction. The Y direction refers to the direction in which light is transferred through the waveguide 140, and the X direction refers to a direction perpendicular to the Y direction on a plane of the waveguide 140. As illustrated in FIG. 6, the input coupler 130 and the output coupler 150 may be arranged on the same surface. FIG. 6 illustrates an example in which the input coupler 130 includes two grating regions 131.

Figure 7:
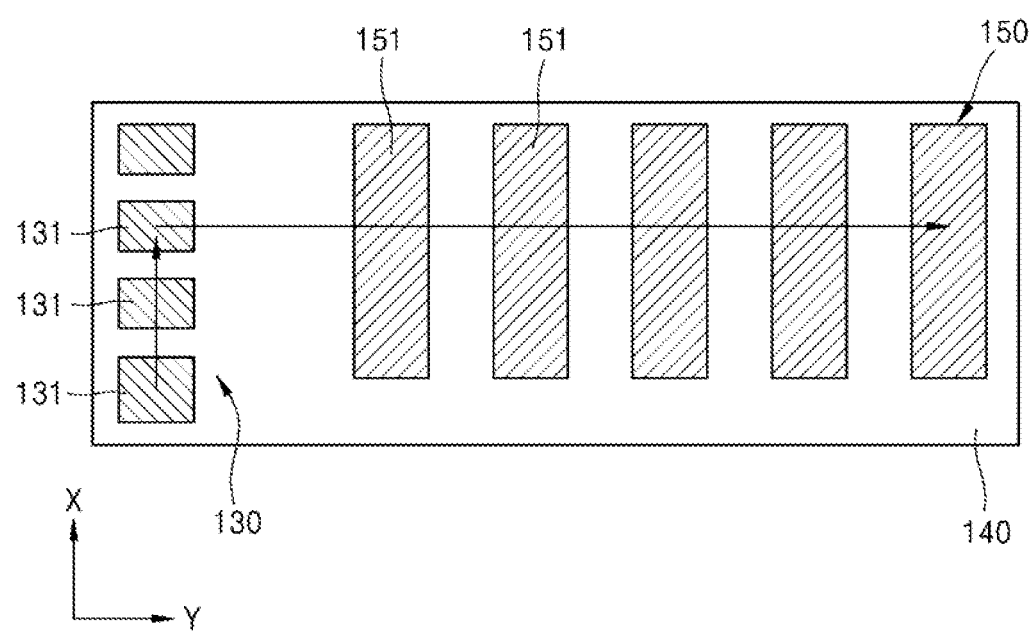
FIG. 7 is a diagram illustrating a waveguide optical device in which grating regions of an input coupler are arranged to be spaced apart from each other, according to an example embodiment.

FIG. 7 illustrates an example in which the input coupler 130 includes four grating regions 131, which are spaced apart from each other in the X direction. In this case, the uniformity of light in the X direction may be increased. In addition, the grating regions 151 of the output coupler 150 may be spaced apart from each other in the Y direction to increase the uniformity of light in the Y direction.

Figure 8:
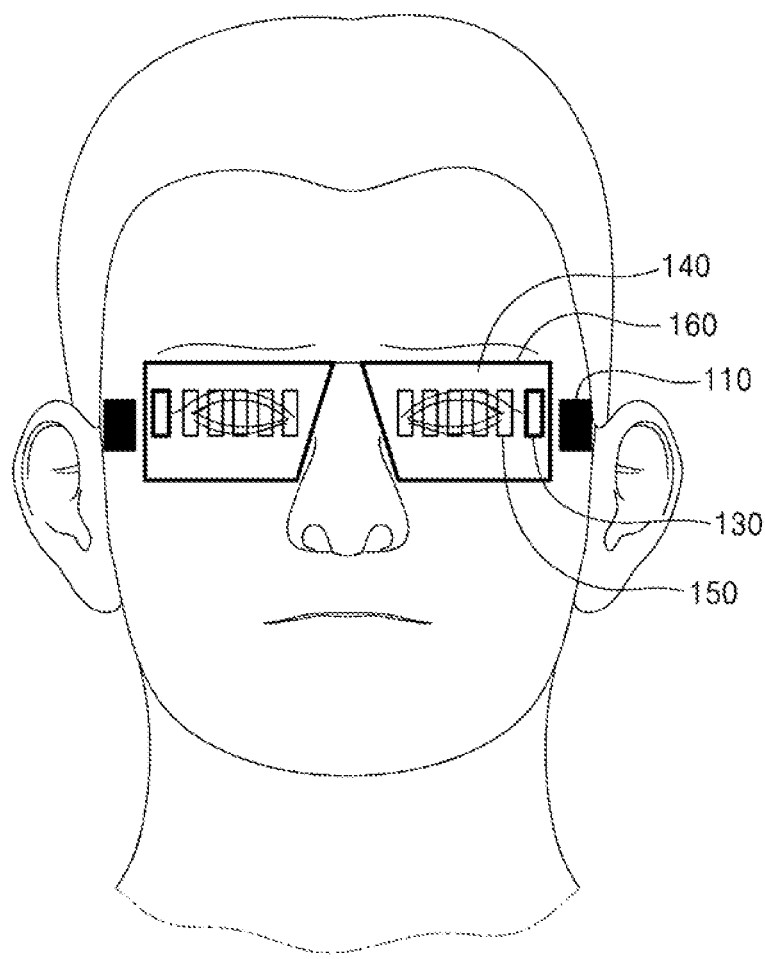
FIG. 8 is a diagram illustrating an example in which a user wears a near-eye display apparatus according to an example embodiment.

FIG. 8 is a diagram illustrating an example in which a user wears a near-eye display apparatus according to an example embodiment. The near-eye display apparatus may include the display element 110 that provides an image, the waveguide 140 that guides the image provided by the display element 110 to an eye of the user, and the input coupler 130 and the output coupler 150 provided in the waveguide 140. The waveguide 140, the input coupler 130, and the output coupler 150 may be provided in a lens portion 160.

Figure 9:
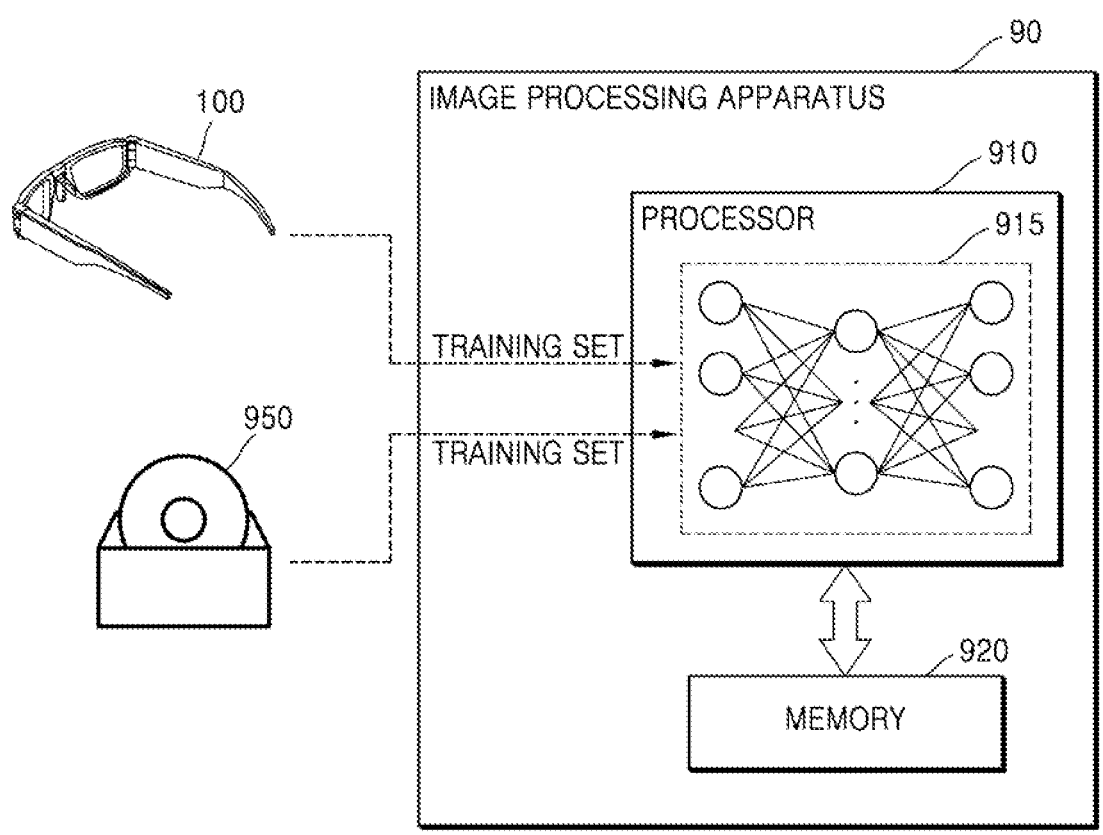
FIG. 9 is a block diagram illustrating hardware components of an image processing apparatus for processing an image to be provided to a near-eye display apparatus, according to an example embodiment.

FIG. 9 is a block diagram illustrating hardware components of an image processing apparatus 90 for processing an image to be provided to the near-eye display apparatus 100, according to an example embodiment.

Referring to FIG. 9, the image processing apparatus 90 may include a processor 910 and a memory 920. However, although FIG. 9 illustrates that the image processing apparatus 90 includes components related to embodiments, it will be understood by one of skill in the art that the image processing apparatus 90 may further include other general-purpose components (e.g., an input/output interface, a network interface, etc.) in addition to the components illustrated in FIG. 9.

The image processing apparatus 90 generates a uniformity correction image and provides the uniformity correction image to the near-eye display apparatus 100 to allow the near-eye display apparatus 100 to display the image with improved brightness uniformity. The image processing apparatus 90 may correspond to a computing device for driving a neural network 915.

The processor 910 may execute the neural network 915 to generate a uniformity correction image. In this case, the processor 910 trains a neural network for modeling a waveguide optical system, by using a training set.

The neural network 915 executable by the processor 910 may be obtained by modeling, into an image processing model, optical propagation in the waveguide optical system for reproducing input optical images as output optical images in the near-eye display apparatus 100. Here, the neural network 915 may be implemented as various types of neural networks for performing deep learning, machine learning, and the like, such as a convolutional neural network (CNN) or a U-Net.

The processor 910 may obtain the training set from the near-eye display apparatus 100 or from a waveguide optical system tool 950, for training the neural network 910. Here, the waveguide optical system tool 950 corresponds to a software program for simulating a hardware structure of a waveguide optical system provided in the near-eye display apparatus 100. The waveguide optical system tool 950 may be utilized to test the operating performance of the hardware structure of an actual waveguide optical system, or to simulate a change in the hardware structure of a waveguide optical system (e.g., a change in the arrangement of grating regions, etc.).

The processor 910 may generate a uniformity correction image by using the neural network 915. Generation of a uniformity correction image will be described in more detail with reference to the corresponding drawings.

The memory 920 is hardware that stores various pieces of data processed by the image processing apparatus 90, and for example, may store neural network data, training set data, and the like that have been processed or are to be processed by the image processing apparatus 90. Also, the memory 920 may store applications, drivers, and the like to be executed by the image processing apparatus 90. The memory 920 may include random-access memory (RAM) such as dynamic RAM (DRAM) or static SRAM, read-only memory (ROM), electrically erasable programmable ROM (EEPROM), a compact disc-ROM (CD-ROM), a Blu-ray or other optical disk storage, a hard disk drive (HDD), a solid-state drive (SSD), or flash memory, and may also include other external storage devices accessible by the image processing apparatus 90.

Figure 10:
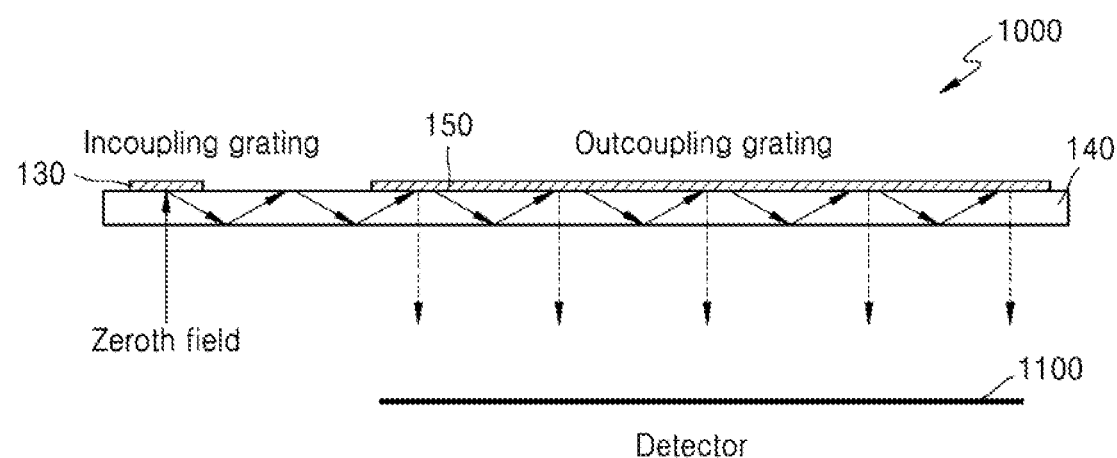
FIGS. 10 and 11 are diagrams for describing an optimization operation for uniformly adjusting the brightness of light emitted from a waveguide optical system provided in a near-eye display apparatus, according to an example embodiment.
Figure 11:
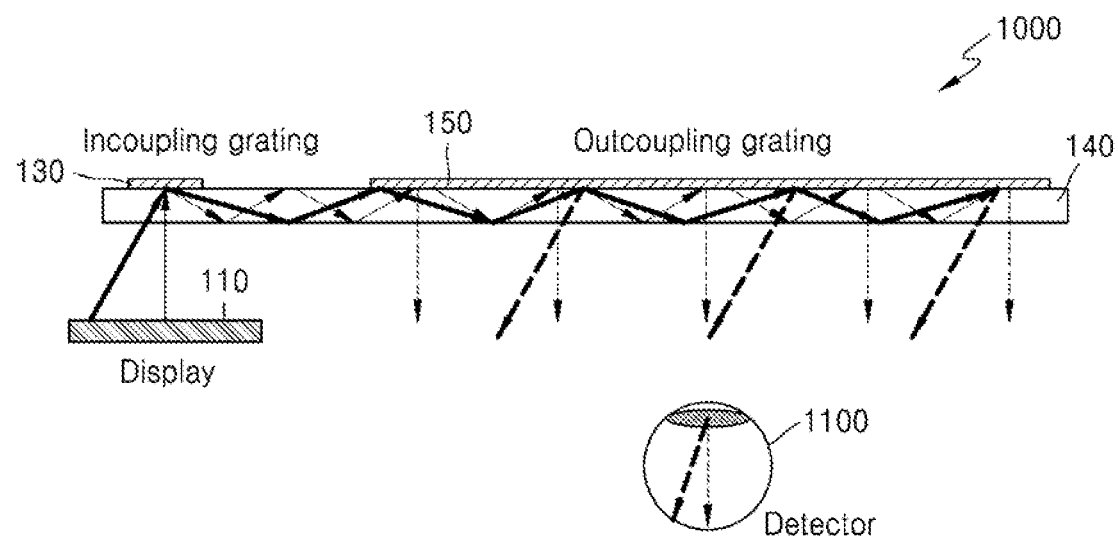

FIGS. 10 and 11 are diagrams for describing an optimization operation for uniformly adjusting the brightness of light emitted from a waveguide optical system 1000 provided in a near-eye display apparatus, according to an example embodiment.

The waveguide optical system 1000 includes the input coupler 130 that inputs light into the waveguide 140, and the output coupler 150 having a a grating region for outputting light propagating within the waveguide 140 to the outside.

Before preparing a training set to be provided to the image processing apparatus 90, the waveguide optical system 1000 may perform optimization of the grating efficiency of the input coupler 130 and the output coupler 150 to improve brightness uniformity.

First, the optimization of the grating efficiency may be performed on the center field (i.e., the zeroth field) so as to make the brightness of light emitted from the output coupler 150 uniform for each position. In detail, when light is incident on the center field (i.e., the zeroth field) of the waveguide optical system 1000 of FIG. 10, the light is output while being propagated/diffracted by the grating regions of the input coupler 130 and the output coupler 150. By detecting the output light by using a separate detector 1100, the optimization of the grating efficiency may be performed for making the brightness of the light uniform for each position. That is, referring to FIG. 10, the optimization may be performed by calculating the efficiency for each position of the grating regions of the output coupler 150 such that the light of uniform intensity is output only for the center field.

Thereafter, the optimization of the grating efficiency may be performed for making the brightness of each position uniform with respect to various fields. Referring to FIG. 11, light of various fields provided by the display element 110 is propagated/diffracted through the grating regions of the output coupler 150, and the separate detector 1100 detects an image reproduced by the waveguide optical system 1000. Thereafter, the optimization may be performed again by calculating the efficiency of each position of the grating regions of the output coupler 150 so as to improve the brightness uniformity of the detected image.

That is, the optimized diffraction efficiency of each of the grating regions of the waveguide optical system 1000 may be determined based on a diffraction efficiency calculated when light perpendicular to the center field of the input coupler 130 is incident, and a diffraction efficiency calculated when light is obliquely incident on the input coupler 130 (as illustrated in FIG. 11).

Meanwhile, the waveguide optical system 1000 described with reference to FIGS. 10 and 11 is a system, the diffraction efficiencies of the grating regions of which have been adjusted to be different from each other for optimization of brightness uniformity of an output optical image, and the optimization of the waveguide optical system 1000 may be performed in actual fabrication of its optical components or may be performed by using the waveguide optical system tool described above.

Figure 12:
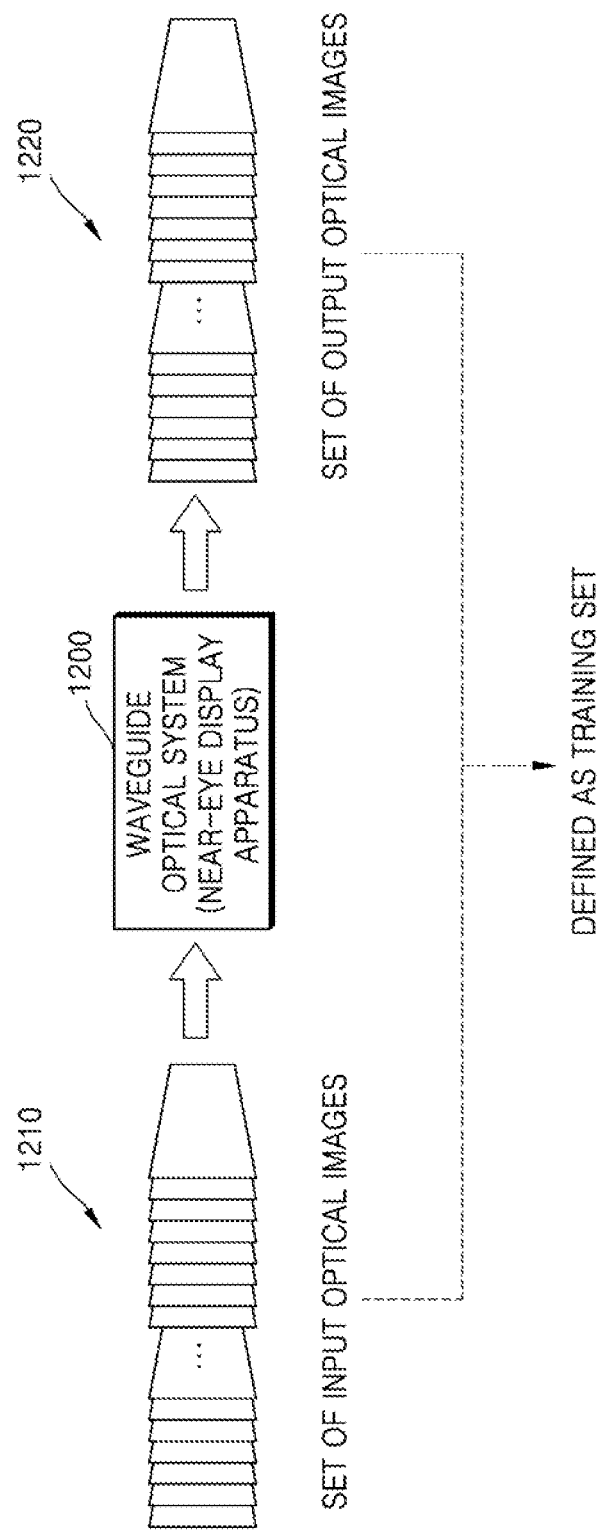
FIG. 12 is a diagram for describing a training set including a set of input optical images and a set of output optical images for a waveguide optical system, according to an example embodiment.

FIG. 12 is a diagram for describing a training set including a set of input optical images and a set of output optical images for a waveguide optical system 1200, according to an example embodiment.

Referring to FIG. 12, the waveguide optical system 1200 is a system on which the optimization of the grating efficiency described with reference to FIGS. 10 and 11 has been performed. The waveguide optical system 1200 illustrated in FIG. 12 may correspond to an actually fabricated apparatus having a waveguide optical structure or may correspond to the waveguide optical system tool described above.

Input optical images 1210 are provided to the waveguide optical system 1200 and then the waveguide optical system 1200 outputs output optical images 1220. That is, the output optical images 1220 are optical images output by the waveguide optical system 1200 provided in the near-eye display apparatus in response to the input optical images 1210 being input to the waveguide optical system 1200.

To generate the neural network 915 (see FIG. 9) for modeling the waveguide optical system 1200, the input optical images 1210 and the output optical images 1220 may be defined as a training set for the neural network 915. For example, the numbers of input optical images 1210 and output optical images 1220 included in the training set may be about 1,000, respectively, but are not limited thereto and may be variously determined.

Figure 13:
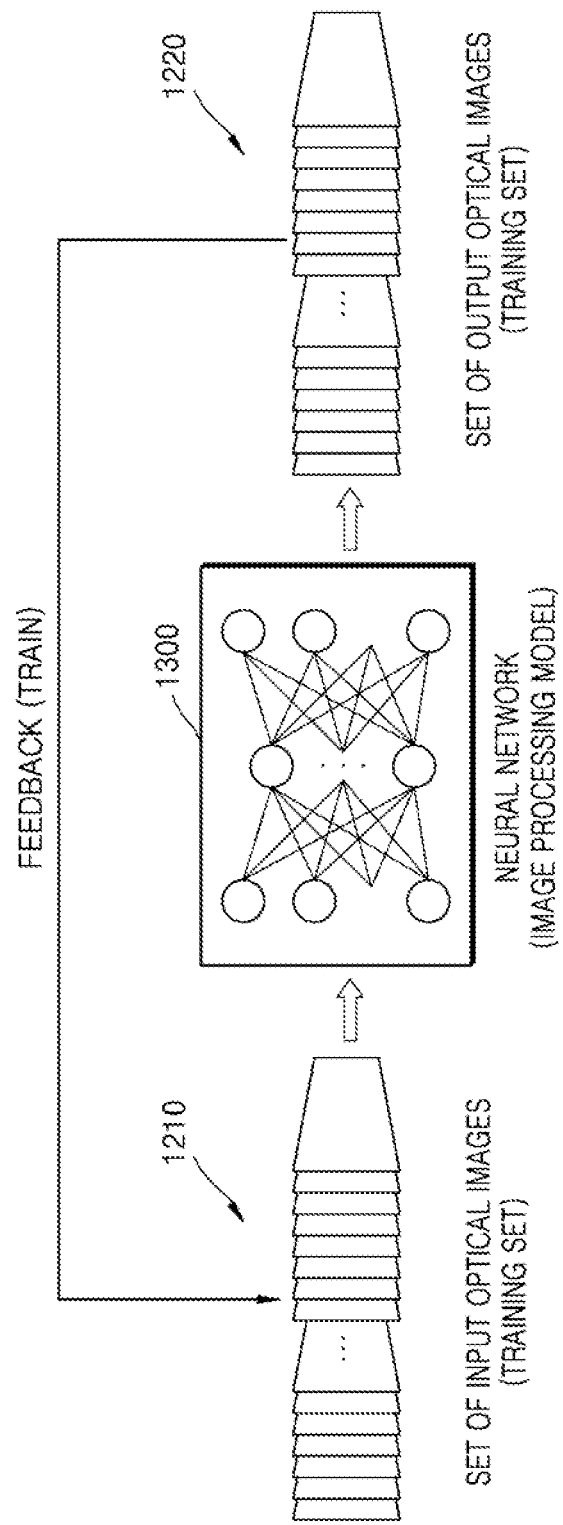
FIG. 13 is a diagram for describing training of a neural network by using a training set, according to an example embodiment.

FIG. 13 is a diagram for describing training of a neural network 1300 by using a training set, according to an example embodiment.

Referring to FIG. 13, the training of the neural network 1300 is performed by the image processing apparatus 90 illustrated in FIG. 9, and the image processing apparatus 90 obtains a set of a plurality of input optical images 1210 and a set of a plurality of output optical images 1220 for the near-eye display apparatus 100.

The neural network 1300 is an image processing model for modeling the waveguide optical system included in the near-eye display apparatus 100, and may be trained by using the training set including the input optical images 1210 and the output optical images 1220. The neural network 1300 may be implemented as various types of neural networks for performing deep learning, machine learning, and the like, such as a CNN or a U-Net.

The neural network 1300 may be iteratively trained to obtain, for a first input optical image, a first output optical image, which is identical to an image output by a waveguide optical system (e.g., the waveguide optical system 1200 illustrated in FIG. 12) when the first input optical image is input thereto, and thus corresponds to the brightness uniformity performance of the waveguide optical system. In addition, the neural network 1300 may be iteratively trained by using the training set until its image processing capability enables generation of an output image with brightness uniformity of a certain level (e.g., about 80%).

Figure 14:
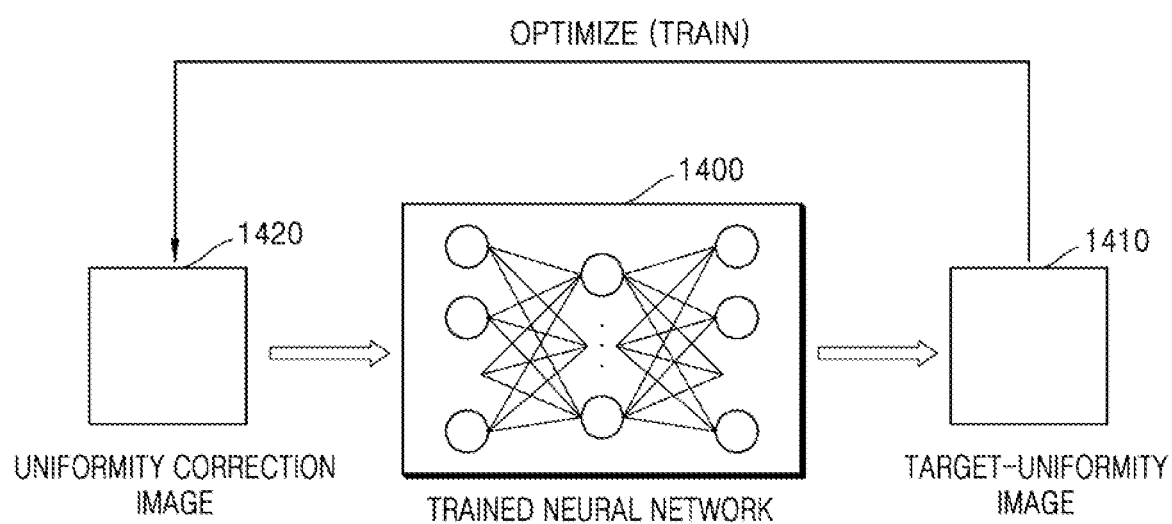
FIG. 14 is a diagram for describing obtaining of a uniformity correction image for outputting a target uniformity image by using a trained neural network, according to an example embodiment.

FIG. 14 is a diagram for describing obtaining of a uniformity correction image for outputting a target uniformity image by using a trained neural network 1400, according to an example embodiment.

Although optimization of the grating efficiency has been performed on the waveguide optical system 1200 (see FIG. 12), the waveguide optical system 1200 may output the output optical images 1220 with reduced brightness uniformity depending on the optical performance of the waveguide optical system 1200. To solve this issue, the image processing apparatus 90 illustrated in FIG. 9 may generate a uniformity correction image 1420 for compensating for or correcting brightness uniformity reduced due to image processing by the neural network 1400 for modeling the waveguide optical system 1200.

In detail, when the training of the neural network 1400 is completed, the image processing apparatus 90 may be trained to generate an image to be input to the trained neural network 1400 such that the trained neural network 1400 outputs a target uniformity image 1410 having a certain brightness uniformity upon the image being input thereto.

Here, the target uniformity image 1410 may include a white color image, but is not limited thereto, and the target uniformity image 1410 may correspond to an image having brightness uniformity of a preset level (e.g., 80%) or greater.

The image processing apparatus 90 (i.e., the processor 910) may obtain the uniformity correction image 1420 by learning and optimizing images to be input to the neural network 1400 in a state in which the target uniformity image 1410 is fixed as the target image of the trained neural network 1400.

That is, the uniformity correction image 1420 may correspond to an input image, which is to be input to the neural network 1400 such that the neural network 1400 then outputs the target uniformity image 1410, and is optimized as a result of iteratively learning input images for the neural network 1400.

Because the neural network 1400 is obtained by modeling the waveguide optical system 1200, when an input optical image to be input to the qwaveguide optical system 1200 is corrected (or compensated for) by using the uniformity correction image 1420, the brightness uniformity of an output optical image to be output from the waveguide optical system 1200 may be further improved. In other words, the brightness uniformity performance of the waveguide optical system 1200 may be improved by using the uniformity correction image 1420.

Figure 15:
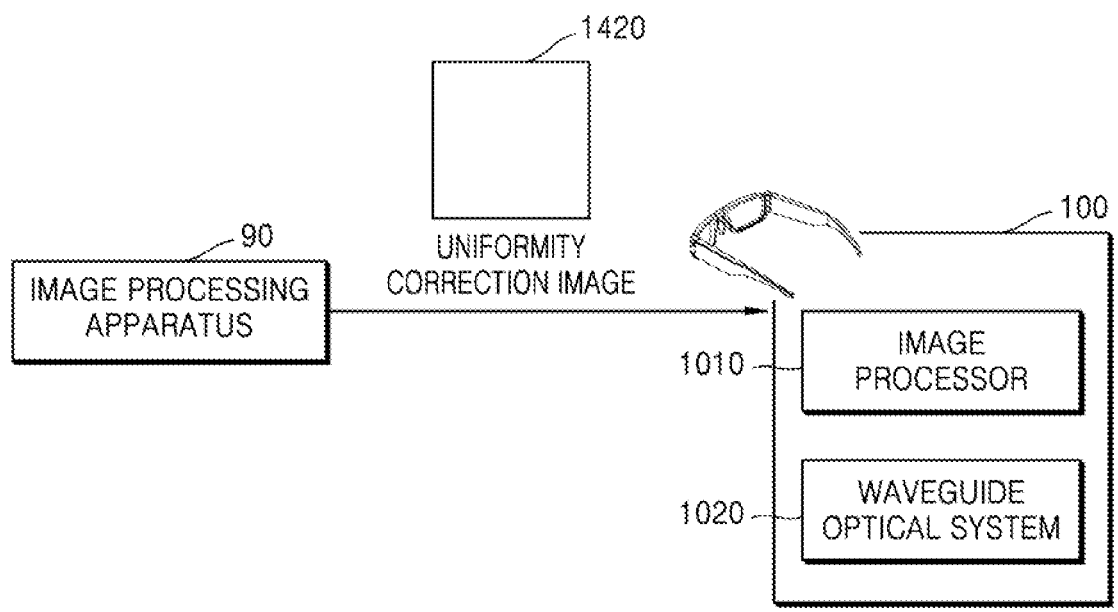
FIG. 15 is a diagram for describing an operation, performed by a near-eye display apparatus, of outputting an image with improved brightness uniformity by using a uniformity correction image, according to an example embodiment.

FIG. 15 is a diagram for describing an operation, performed by the near-eye display apparatus 100, of outputting an image with improved brightness uniformity by using the uniformity correction image 1420, according to an example embodiment.

Referring to FIG. 15, the image processing apparatus 90 provides the uniformity correction image 1420 to the near-eye display apparatus 100. Here, the uniformity correction image 1420 may correspond to an image trained to cause a neural network for modeling the waveguide optical system on which the optimization of the grating efficiency of the grating regions is performed as described above, to output a target image having a certain brightness uniformity. Furthermore, the uniformity correction image 1420 may be obtained by learning images to be input to the neural network in a state in which the target image is fixed as the output image of the neural network. The near-eye display apparatus 100 outputs, via a waveguide optical system 1020, an image obtained by combining an input optical image with the uniformity correction image 1420.

A memory included in the near-eye display apparatus 100 may store the uniformity correction image 1420 previously generated for correcting brightness uniformity with respect to an input optical image to be displayed through the near-eye display apparatus 100.

In detail, an image processor 1010 of the near-eye display apparatus 100 performs image processing to combine the uniformity correction image 1420 provided from the image processing apparatus 90 with the input optical image so as to generate an image. That is, the image processor 1010 may generate an output optical image in which the brightness uniformity of the input optical image is corrected by performing an image processing operation of combining the input optical image with the uniformity correction image 1420. Here, the input optical image is an image to be displayed through the near-eye display apparatus 100, and the combining of the uniformity correction image 1420 with the input optical image may be a convolution operation of the uniformity correction image 1420 with the input optical image. However, the disclosure is not limited thereto, the combining of the uniformity correction image 1420 with the input optical image may be other types of image processing operations for compensating for (correcting) or adjusting the brightness uniformity of the input optical image by using the uniformity correction image 1420, in addition to the convolution operation.

The waveguide optical system 1020 of the near-eye display apparatus 100 outputs an output optical image based on image light corresponding to the generated image.

Accordingly, the near-eye display apparatus 100 may display an image with improved brightness uniformity for a user by outputting, via the waveguide optical system 1020, an image obtained by combining an input optical image with a uniformity correction image. The near-eye display apparatus 100 may pre-store the uniformity correction image 1420 in a memory provided therein, and output an image with improved brightness uniformity via the waveguide optical system 1020 by combining the stored uniformity correction image 1420 with each image to be displayed through the near-eye display apparatus 100.

FIG. 16 is a diagram for describing an image processing method according to an example embodiment. The image processing method illustrated in FIG. 16 is related to the embodiments described above with reference to the drawings, and thus the descriptions provided above but omitted below may be applied to the method illustrated in FIG. 16.

In operation 1601, the processor 910 of the image processing apparatus 90 obtains a set of a plurality of input optical images and a set of a plurality of output optical images for the near-eye display apparatus 100. Here, the output optical images are optical images output by the waveguide optical system provided in the near-eye display apparatus 100 upon the input optical images being input to the waveguide optical system.

In operation 1602, the processor 910 trains a neural network for modeling the waveguide optical system by using a training set including the obtained input and output optical images.

In operation 1603, when the training of the neural network is completed, the processor 910 obtains a uniformity correction image to be input to the trained neural network such that the trained neural network then outputs a target uniformity image having certain brightness uniformity.

Meanwhile, the above-described method may be recorded in a non-transitory computer-readable recording medium having recorded thereon one or more programs including instructions for executing the method. Examples of the computer-readable recording medium include magnetic media such as hard disks, floppy disks, or magnetic tapes, optical media such as CD-ROMs or digital video discs (DVDs), magneto-optical media such as floptical disks, and hardware devices such as ROM, RAM, and flash memory, which are specially configured to store and execute program instructions. Examples of the program instructions include not only machine code, such as code made by a compiler, but also high-level language code that is executable by a computer by using an interpreter or the like.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. An image processing method comprising:
obtaining a plurality of input optical images and a plurality of output optical images for a near-eye display apparatus, the plurality of output optical images being output by a waveguide optical system provided in the near-eye display apparatus when the plurality of input optical images is input to the waveguide optical system;
training a neural network for modeling the waveguide optical system by using a training set comprising the obtained plurality of input optical images and the obtained plurality of output optical images; and
obtaining, when the training of the neural network is completed, a uniformity correction image to be input to the trained neural network such that the trained neural network then outputs a target uniformity image having a certain brightness uniformity,
wherein the trained neural network is obtained by modeling, into an image processing model, optical propagation in the waveguide optical system of the near-eye display apparatus for reproducing the plurality of input optical images as the plurality of output optical images.

2. The image processing method of claim 1, wherein the trained neural network is configured to obtain, upon a first input optical image being input thereto, a first output optical image, which is identical to an image output by the waveguide optical system upon the first input optical image being input thereto, and thus corresponds to a brightness uniformity performance of the waveguide optical system.

3. The image processing method of claim 1, wherein the obtaining of the uniformity correction image comprises obtaining, by a processor, the uniformity correction image by learning images to be input to the trained neural network in a state in which the target uniformity image is fixed as a target image of the trained neural network.

4. The image processing method of claim 1, wherein the target uniformity image comprises a white color image.

5. The image processing method of claim 1, wherein the waveguide optical system comprises an input coupler that inputs light into a waveguide, and an output coupler comprising a plurality of grating regions for outputting the light propagating in the waveguide to an outside.

6. The image processing method of claim 5, wherein diffraction efficiencies of the plurality of grating regions are adjusted to be different from each other for optimization of a brightness uniformity of each output optical image of the plurality of output optical images.

7. The image processing method of claim 6, wherein the diffraction efficiency of each of the plurality of grating regions is determined based on a diffraction efficiency calculated when light perpendicular to a center field of the input coupler is incident on the input coupler, and based on a diffraction efficiency calculated when light is obliquely incident on the input coupler.

8. The image processing method of claim 1, further comprising providing the obtained uniformity correction image to the near-eye display apparatus, wherein the near-eye display apparatus outputs, via the waveguide optical system, an image obtained by combining an input optical image with the obtained uniformity correction image.

9. A non-transitory computer-readable recording medium having recorded thereon a program for executing the method of claim 1 on a computer.

10. An image processing apparatus comprising:
a memory; and at least one processor configured to execute a program to process an image to be provided to a near-eye display apparatus, wherein the at least one processor is further configured to
obtain a plurality of input optical images and a plurality of output optical images for the near-eye display apparatus;
train a neural network for modeling a waveguide optical system of the near-eye display apparatus by using a training set comprising the obtained plurality of input optical images and the plurality of output optical images; and
obtaining, when the training of the neural network is completed, a uniformity correction image to be input to the trained neural network such that the trained neural network then outputs a target uniformity image having a certain brightness uniformity,
wherein the plurality of output optical images are output by the waveguide optical system when the plurality of input optical images are input to the waveguide optical system, and
wherein the neural network is obtained by modeling, into an image processing model, optical propagation in the waveguide optical system of the near-eye display apparatus for reproducing the plurality of input optical images as the plurality of output optical images.

11. The image processing apparatus of claim 10, wherein the trained neural network is configured to obtain, upon a first input optical image being input thereto, a first output optical image, which is identical to an image output by the waveguide optical system upon the first input optical image being input thereto, and thus corresponds to a brightness uniformity performance of the waveguide optical system.

12. The image processing apparatus of claim 10, wherein the at least one processor is further configured to obtain the uniformity correction image by learning images to be input to the trained neural network in a state in which the target uniformity image is fixed as a target image of the trained neural network.

13. The image processing apparatus of claim 10, wherein the target uniformity image comprises a white color image.

14. The image processing apparatus of claim 10, wherein the waveguide optical system comprises an input coupler that inputs light into a waveguide, and an output coupler comprising a plurality of grating regions for outputting the light propagating in the waveguide to an outside.

15. The image processing apparatus of claim 14, wherein diffraction efficiencies of the plurality of grating regions are adjusted to be different from each other for optimization of a brightness uniformity of each output optical image of the plurality of output optical images.

16. The image processing apparatus of claim 15, wherein the diffraction efficiency of each of the plurality of grating regions is determined based on a diffraction efficiency calculated when light perpendicular to a center field of the input coupler is incident on the input coupler, and based on a diffraction efficiency calculated when light is obliquely incident on the input coupler.

17. The image processing apparatus of claim 10, wherein
the image processing apparatus is configured to provide the obtained uniformity correction image to the near-eye display apparatus, and
wherein the near-eye display apparatus outputs, via the waveguide optical system, an image obtained by combining an input optical image with the obtained uniformity correction image.

18. A near-eye display apparatus comprising:
the at least one processor configured to perform image processing to generate an image by combining an input optical image with the uniformity correction image obtained from the image processing apparatus of claim 10; and
the waveguide optical system configured to output an output optical image based on image light corresponding to the generated image.

19. A near-eye display apparatus comprising:
a memory storing a previously generated uniformity correction image for correcting a brightness uniformity of an input optical image to be displayed through the near-eye display apparatus;
an image processor configured to generate an output optical image in which the brightness uniformity of the input optical image is corrected by performing an image processing operation of combining the input optical image with the uniformity correction image; and
a waveguide optical system configured to output the output optical image based on image light corresponding to the output optical image,
wherein the uniformity correction image corresponds to an image configured to cause a neural network for modeling the waveguide optical system on which optimization of grating efficiency of grating regions is performed, to output a target image having a certain brightness uniformity.

20. The near-eye display apparatus of claim 19, wherein the image processing operation comprises a convolution operation between the input optical image and the uniformity correction image.

21. The near-eye display apparatus of claim 19, wherein the uniformity correction image is obtained by learning images to be input to the neural network in a state in which the target image is fixed as an output image of the neural network.

* * * * *